THOMAS SIM.
Apparatus for Separating Fatty Matters from Vegetable Substances.
No. 121,903. Patented Dec. 12, 1871.

4 Sheets--Sheet 3.

THOMAS SIM.

Apparatus for Separating Fatty Matters from Vegetable Substances.

No. 121,903. Patented Dec. 12, 1871.

ATTEST.
Walter Allen
Wm. H. Brereton Jr.

INVENTOR.
Thomas Sim
by Knight Bro
attys.

THOMAS SIM.
Apparatus for Separating Fatty Matters from Vegetable Substances.

No. 121,903.   Patented Dec. 12, 1871.

ATTEST.  
Walter Allen  
Wm H. Brereton Jr.

INVENTOR.  
Thomas Sim  
by Knight Bros Attys

UNITED STATES PATENT OFFICE.

THOMAS SIM, OF BALTIMORE, MARYLAND.

IMPROVEMENT IN APPARATUS FOR SEPARATING FATTY MATTERS FROM VEGETABLE SUBSTANCES.

Specification forming part of Letters Patent No. 121,903, dated December 12, 1871.

*To all whom it may concern:*

Be it known that I, THOMAS SIM, of Baltimore, in the county of Baltimore, State of Maryland, have invented certain Improvements in Apparatus for Separating Oily and Fatty Matters from Animal and Vegetable Substances, of which the following is a specification:

This apparatus is designed to extract the fixed and essential oils or fatty matters from vegetable or animal substances. I do not limit myself to any particular subject of operation, but may cite more particularly corn-meal, cotton-seed meal, flax-seed meal, meal of other oleaginous seeds and nuts; purifying palm-oil; removing it from the albumen, fibrous matters, and dirt; cleaning wool from smut, grease, and dirt; cleaning fur clippings for hatters; cleaning cotton-waste of engineers and machinists; treating seeds, herbs, barks, flowers, &c., for the extraction of the essential oils therefrom. For this purpose the sulphide of carbon ($CS_2$) should be perfectly deodorized. The operation consists in passing a body of the $CS_2$ through a mass of the matter under treatment, dissolving and carrying off the oily or fatty matters, then distilling off the $CS_2$ and returning it to the reservoir to be again used. The $CS_2$ with which the mass becomes saturated is then removed from the mass by heat.

Figure 1:
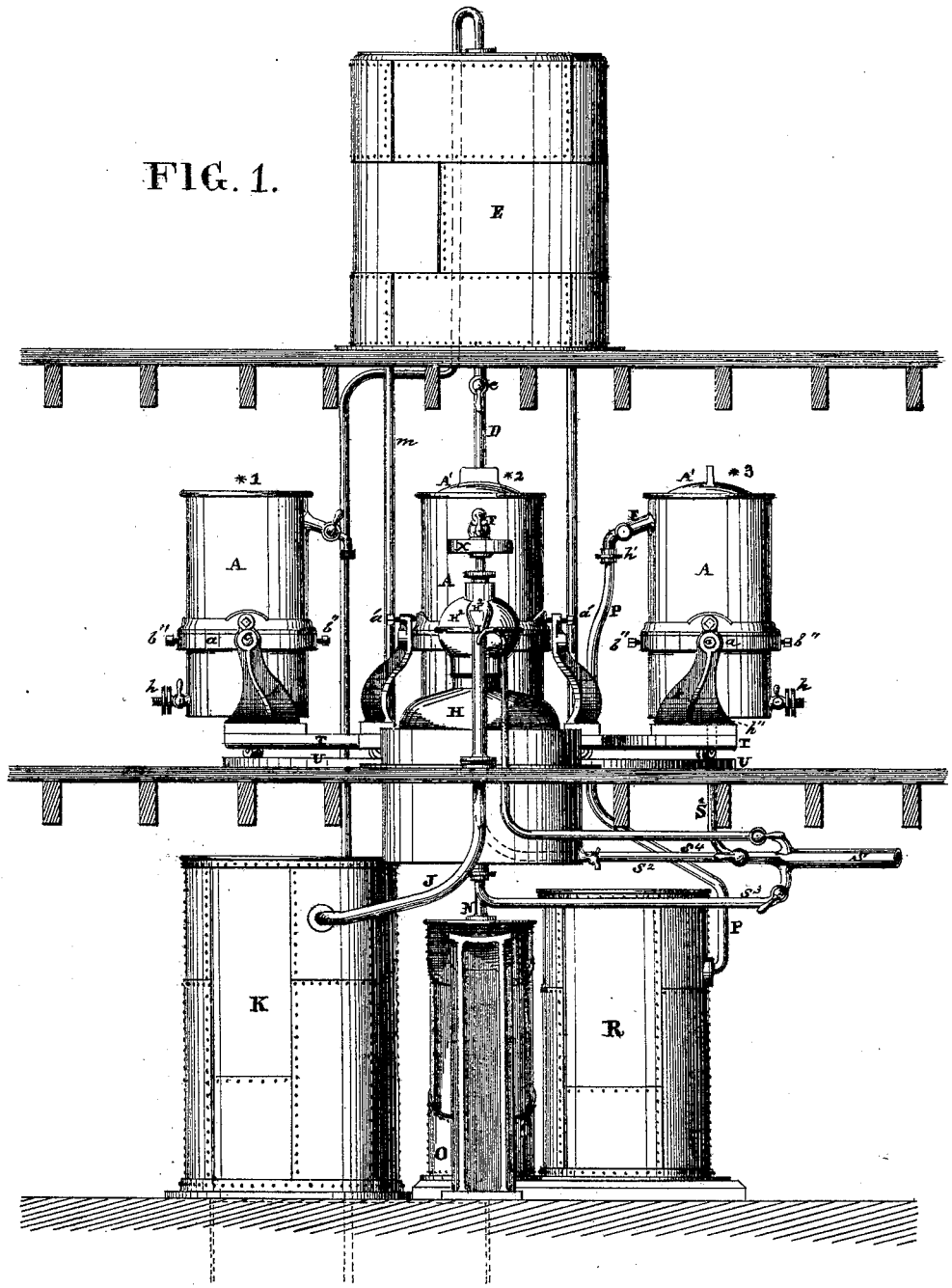
Figure 2:
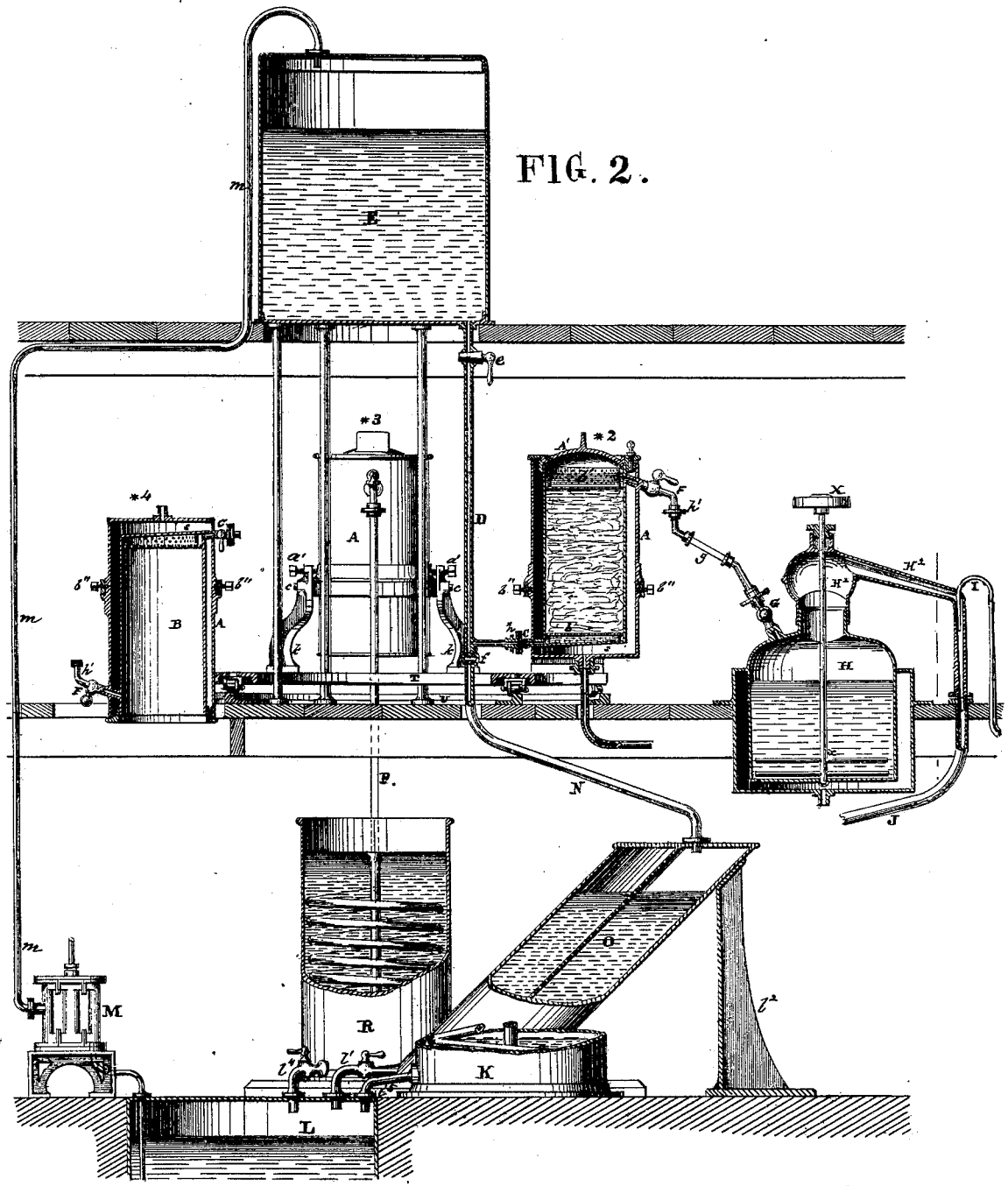
Figure 3:
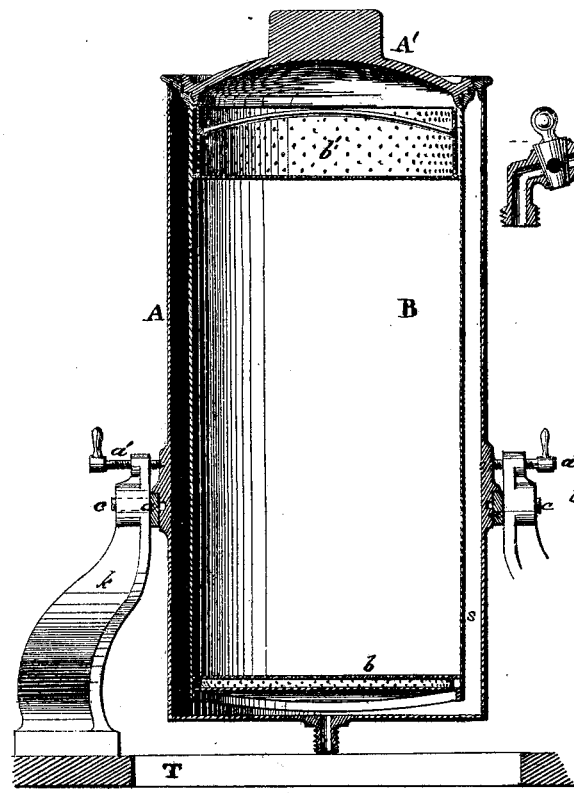
Figure 4:
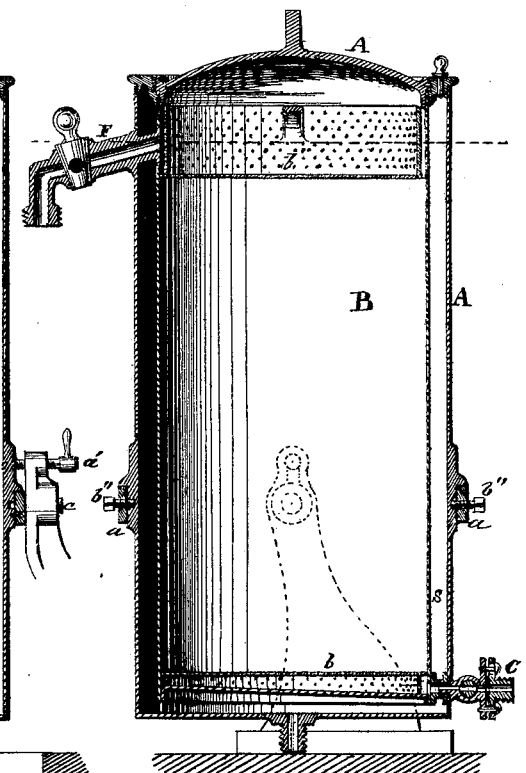
Figure 5:
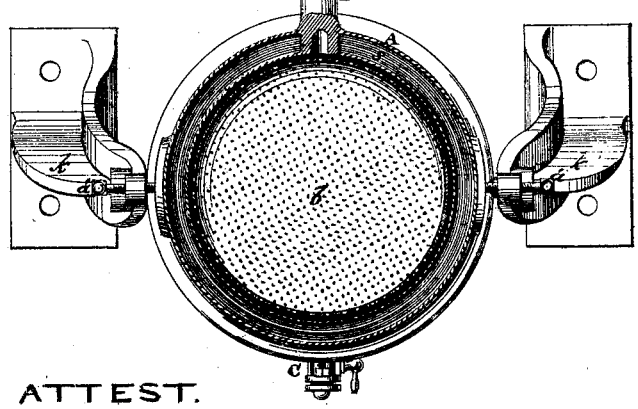
Figure 6:
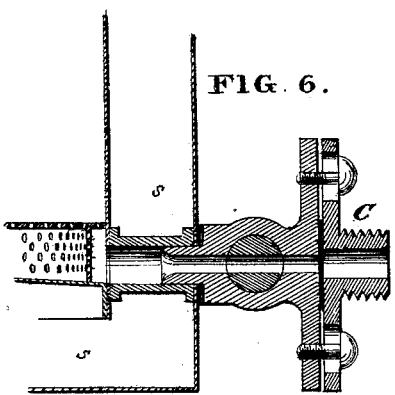
Figure 7:
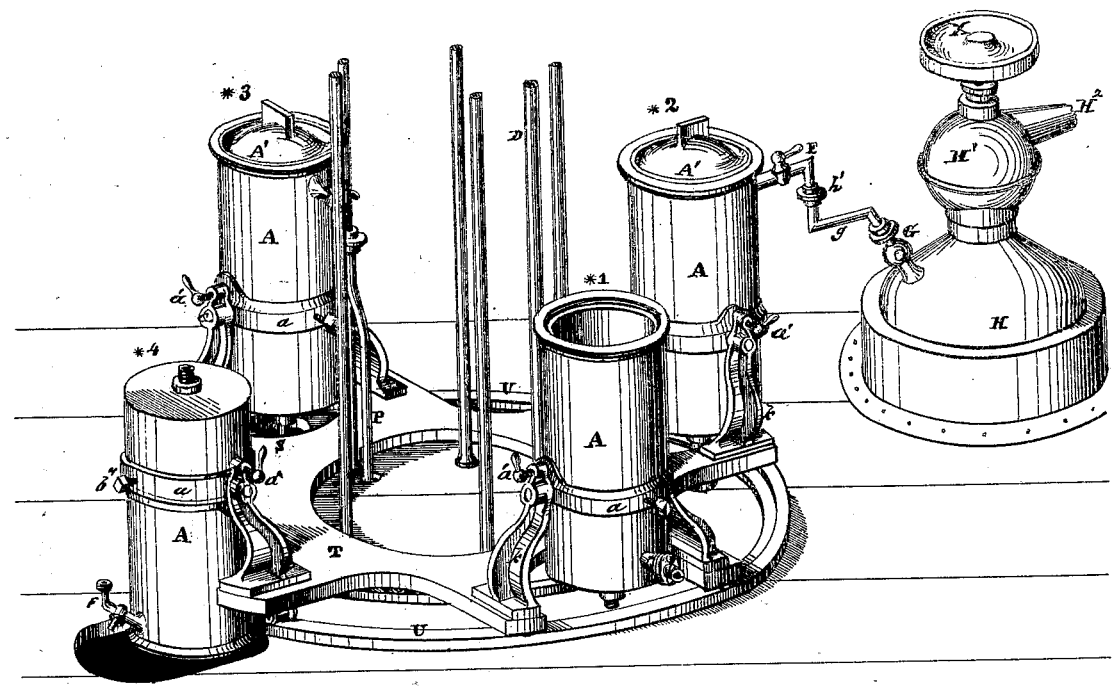
Figure 8:
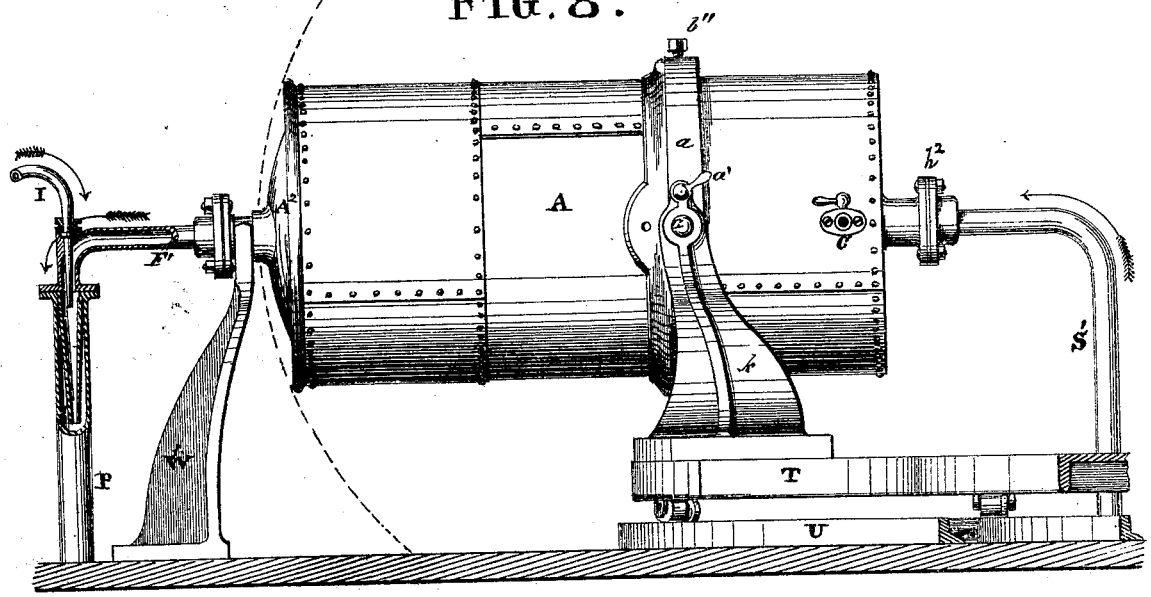

Figure 1 is an elevation of the apparatus, showing it as occupying three floors in a building, the vats occupying positions *1 and *3 being on the flanks in the picture. Fig. 2 is a vertical section in a plane at right angles to the elevation; the vats occupying positions *4 and *2 being on the flanks in the picture. Some of the apparatus shown on the ground floor in this figure are in partial section only. Fig. 3 is a vertical sectional view of a single vat, resting in its trunnion-ring on the standards. Fig. 4 is also a vertical section of a vat, but is taken in a plane at right angles to the former. Fig. 5 is a horizontal section of a vat just above the level of the eduction F. Fig. 6 is an enlarged view of the pipe-coupling by which the supply-pipe is placed in connection with the vat. Fig. 7 is a perspective projection of the apparatus. Fig. 8 is an elevation of a vat in a horizontal position, its bottom being in connection with the steam-pipe and its top with a pipe leading to a vapor-condenser.

In the drawing, Figs. 1 and 2 represent the apparatus as occupying three stories of a building. On the middle floor is a traversing platform, T, shown pretty clearly in the perspective view, Fig. 7. This is supported on a circular track, V, rollers supporting the platform, which is moved by any sufficient power, by hand or by steam, as may be desired. Upon this platform are a number of vats, made with double walls A B so as to afford in each a steam space around and beneath. The steam connection is made to each vat in turn, as the latter comes to a certain position, as will hereafter be explained. The vats are similar in construction and adaptation, and the description of one will answer for each. Figs. 3 and 4 are vertical sectional views of the vats, on a larger scale than represented in the general views, Figs. 1, 2, and 7. The section, Fig. 3, is taken in the plane of the trunnions; Fig. 4, in a plane at right angles to the former. Figs. 3 and 5 are designed to show more specifically the mode of hanging the vat in a ring, $a\ a$, resting by trunnions $c\ c$ in bearing on the standards $k\ k$, which are erected upon the platform T. At the point where the vat A rests upon the ring $a\ a$ it has an enlargement, with a rabbeted shoulder, as seen in Fig. 3, and the vertical safety of the vat is assured by a pair of set-screws, $a'\ a'$, which, passing through the upper part of the standards, impinge upon the sleeve enlargement at that part of the vat. The steam-jacket space $s$ surrounds the sides and bottom of the pan, and a lid, $A^1$, is luted upon the top so as to make it air-tight when the operation is in progress. The vat has a false bottom, $b$, which is perforated so that bi-sulphide of carbon $CS_2$ introduced at the pipes C D from the upper reservoir E may escape upward into the vat. $b'$ is a perforated diaphragm, which rests upon the matter under treatment in the vat and holds it down; also acting as a strainer to allow the $CS_2$ to escape and pass off by the pipe F, while detaining the solid matters under treatment. $b''$, Fig. 4, are two set-screws, which, with others, fasten the vat and ring together so that the former shall not escape from the latter when the vat is inverted, as shown, in the discharging position, indicated by *4 in Figs. 2 and 7. In Fig. 8 the vat A is shown in a horizontal position, so that it may be rotated in its ring while the latter rests by its trunnions $c\ c$ on the standards $k\ k$. In this position the steam-pipe $S^1$ from the main steam-pipe S is connected to the bottom of the vat so as to fill the steam-jacket $s$, while for the usual cover $A^1$ a cover, $A^2$, is substituted, having a neck which rests upon the standard W, and an eduction-pipe, F', which leads by a pipe, P, to a condenser, R, wherein is condensed the vapor passing from the vat A B at a certain stage of the operation. H is a cucurbit, $H^1$ the alembic, and $H^2$ the rostrum of a still, which occupies a permanent place on the floor in the immediate vicinity of the position *2 of the vat. As the different stages of the operation are effected in each vat, the platform T is revolved so that each vat in turn occupies each of the positions. In the second position the interior of the vat A is connected by pipes F G with the still H, so that the contents of A overflowing into the still are there vaporized and carried off by the pipe J to the condenser K, from whence they pass by faucet $l^5$ into the general reservoir L. I is an injector supplied from the pipe $S^4$, which is one of the branches of the general steam-pipe S. The effect of the injector is to determine the direction downward of the vapor passing from the rostrum $H^2$ into the pipe J, producing a partial vacuum in the alembic $H^1$, and thus facilitating the vaporization of the contents of the still. X $x$ is a stirrer, by which the contents of the lower portion of the cucurbit are stirred up to make a circulation of the liquid. At a certain stage of the operation, as will presently appear, the liquid in the vat A B is allowed to drain off through the pipe N. It is conducted through a filter, O, being introduced into the lower division and passing upwardly through the slanting perforated partition into the upper division, whence it is drawn through a faucet, $l^1$, into the general reservoir L. $l^2$ is the post supporting the upper end of the inclined filter. P is a pipe connecting the upper portion of the vat with a condenser, R, so that when the vat occupies the position *3, as shown clearly in Fig. 1, the liquid contents of the vat vaporized by the heat of the jacket $s$ shall pass off, and, being conducted to the condenser R, shall then be discharged into general reservoir L through the faucet $l^3$. From this reservoir the liquid is elevated by the pump M through the pipe $m$ into the elevated reservoir E. When in the fourth position *4 the pan may be rotated on its trunnions and inverted, as shown in Figs. 2 and 7.

I will describe the action of my apparatus by tracing the series of operations in one vat; and here I desire to state that the multiplication of the vats is a matter of convenience, economy, and capacity, and not a necessary incident to the working of my patent, although I do claim certain features by which the operation of a number of vats may conveniently be assured and maintained. Selecting a single vat and referring to the general view, Figs. 1, 2, and 7. *1 is the position occupied by the vat A B to receive its charge of meal, wool, or other substance to be treated. The charge is preferably weighed out and contained in a hopper on the floor above, and is let down into the vat when in position *1. The lid of the vat is then closed, and the vat is moved to position *2. In the second position *2 the induction-pipe C is coupled to the pipe D leading from the elevated reservoir E, in which the bisulphide of carbon $CS_2$ is contained. The eduction-pipe F is coupled to the pipe G leading to the still H, a part of the connection being a glass gauge-tube, $g$, through which the color of the passing liquid is observed. The spigot $e$ is now turned, and the bisulphide of carbon flows by its gravity from the elevated reservoir E through the pipe D into the space below the perforated diaphragm $b$ of the meal-chamber. The lower stratums of the meal will become saturated with the $CS_2$, and the latter rises through the mass, dissolving the oil and carrying it along in solution toward the eduction opening, and thence through the pipe F G to the still H. As the oil in the lower stratum of meal becomes dissolved the combined liquids (what I may call a solution, for convenience of statement) are pushed up by constantly arriving bodies of fresh $CS_2$. As the first quantity of $CS_2$ rises through the mass it continues to meet with oil throughout its whole progress upward, and, speaking of the vat contents as existing at a time soon after the $CS_2$ has commenced to flow out at the eduction-pipe F, the lower portion is relatively free from oil, while the latter is superabundant at the upper part. The fresh $CS_2$ keeps urging forward the solution, whose specific gravity constantly lessens as it receives the accessions of oil in its upward journey through the meal. Thus the pure $CS_2$ sweeps upwardly, constantly carrying before it any remaining quantity of oil until all has been eliminated. When all the oil from the whole mass has been removed or passed by overflow into the still the conclusion of this part of the process will become evident by the pellucid character of the liquid as it passes through the glass section $g$ of the eduction-pipe. I have described the action of the $CS_2$ in dissolving the oil and then floating it away from the meal, and have traced this action to the point at which the said separation becomes complete. I must, however, draw attention to the fact that when the body of $CS_2$ with the oil in solution rises to the top of the chamber it commences to flow off by the pipe F, which conducts it to the cucurbit H, which is heated by steam to such a temperature, say about 120° Fahrenheit, that the $CS_2$ is vaporized, and, passing into the alembic $H^1$, is educed through the rostrum $H^2$. To facilitate the passage of the vapor from the alembic a jet of steam is introduced by the injector I, which determines the direction of the current of vapor outward from the alembic and downward by the pipe J to the condenser K, whence the condensed liquids HO and $CS_2$ pass into the lower reservoir L, Fig. 2. The water instantly rises, owing to its lesser specific gravity, and as it accumulates is decanted off at overflow opening. The $CS_2$ is raised by pump M from the reservoir L to the elevated reservoir E, from whence it again resumes its round of duties. The operation of the $CS_2$ in the vat which was selected for illustration being complete, the flow of $CS_2$ from the reservoir E is now stopped by turning the spigot $e$. The spigot $f$, Fig. 2, is then turned to allow the stand-pipe D to empty, and also to permit the $CS_2$ in the vat A B to run off until the substance in the said vat is drained as dry as it can readily be in the time permissible for the said drainage. The $CS_2$ passes by the pipe N to the filter O, and thence to the reservoir L, above referred to. The couplings $h$ and $h^1$ are now disengaged, and the vat is ready to be removed to the third position *3. In the third position, indicated by the sign *3, the vat is turned one-half around in its supporting ring, presenting the faucet F inwardly so that it may be connected by pipe P with a worm in the condenser R. Steam is now admitted by pipe $S^1$ to the jacket $s$ of the vat, and a heat of, say, about 120° Fahrenheit is obtained, which vaporizes the $CS_2$, and it passes from the vat to the condenser, whence it reaches the reservoir. A steam injector is used in connection with the pipe P to assist in carrying off the vapor from the vat. The meal or other substance is now clear of oil by the previous process, and of $CS_2$ by the process just described; and the couplings $h^1$ $h^2$ being disconnected, the vat is ready to be moved to the fourth position, *4. In the fourth position, indicated by this sign *4, the vat is to be emptied. For this purpose it is brought over the hopper which is to receive its contents, the lid is removed and vat upset, as seen in Figs. 2 and 7. The vat is then removed to the first position, *1, ready for another change.

What I have described as the course of progress of one vat is true of each in its order. Four of them being used, one will be in each of the positions noted, taking the positions successively. Instead of four, I may use eight, twelve, or sixteen, or more vats, it being merely a question of convenience and capacity. I can also pass the contents of a single vat through the various operations without moving it from its place. The plan shown of mounting four vats on carriages which traverse on a circular track is one dictated by convenience and compactness, bringing each in turn to the various stations for charging, oil separating, distilling off the $CS_2$, and discharging the finished product. It has also the merit of keeping the vats within a moderate distance of the reservoirs of supply and collection. In some cases it becomes desirable to throw the vat upon its side when distilling off the $CS_2$, and rolling it over and over in its hoop so as to agitate the contents and facilitate the escape of the $CS_2$ from the mass which is heated by the steam-jacket. This position is shown in Fig. 8. In this the ordinary cover of the vat A is removed, and another substituted having a nozzle, which is brought into contact with a pipe, P, leading to a condenser, R, in which the vapor is condensed. To facilitate the escape of the vapor a steam-jet, I, is introduced, similar to that shown at the end of the rostrum in the second position *2, formerly described. This jet acts as a vapor-pump, to determine the direction of motion of the vapor and produce a partial vacuum in the vat. The rotation of the vat A is accomplished by any suitable means, a sliding joint being provided at the couplings with the pipes at the respective ends. The steam is admitted by the pipe S, and the vapor educted at the end which connects with the pipe P, down which the steam-jet is projected.

I claim—

1. In combination with vat A B and a still, a steam-jet vapor-exhauster, operating substantially as described.

2. The vat A B, mounted on trunnions upon a traversing carriage, by which it is made presentable at the various stations, substantially as and for the purpose described.

3. The arrangement of several vats on a circular or other track upon a carriage or carriages, or in a series, so as to be consecutively presented in the charging, operating, and discharging situations, for the purpose described.

4. The general arrangement of the vats A B, &c., reservoir E, still H, condenser K, vapor-eduction P, reservoir R, and general reservoir L, substantially as described and represented.

To the above specification of my apparatus for separating oily and fatty matters from vegetable and animal matters I have put my hand this 31st day of August, 1871.

THOS. SIM.

Witnesses:
EDWARD H. KNIGHT,
WALTER ALLEN.

(35)